Sept. 8, 1964 J. D. LESLIE ETAL 3,147,945
MANUAL SIX-WAY SEAT ADJUSTER
Filed March 28, 1962 3 Sheets-Sheet 1
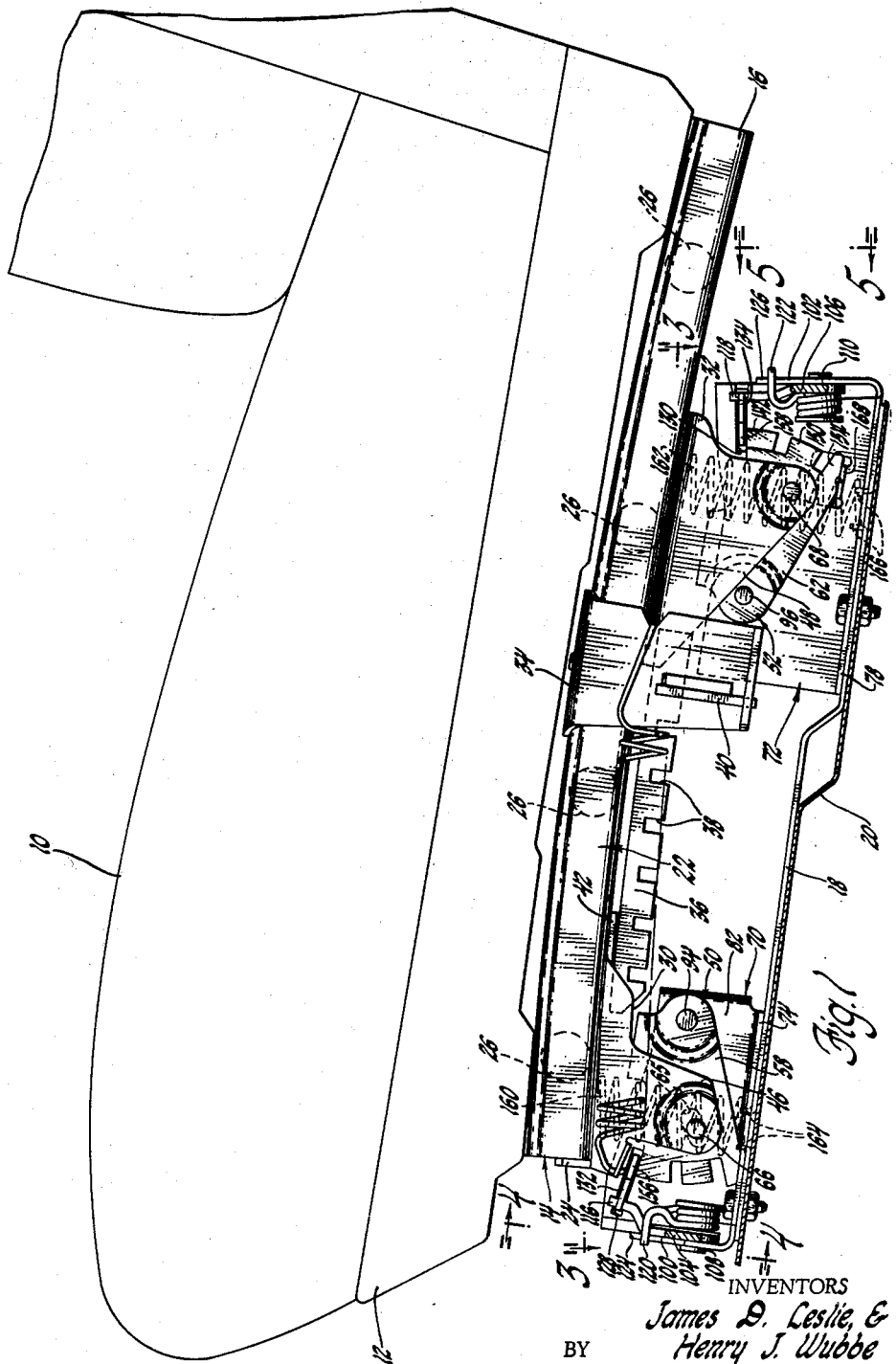
INVENTORS
James D. Leslie, &
Henry J. Wubbe
BY
J. L. Carpenter
ATTORNEY Sept. 8, 1964    J. D. LESLIE ETAL    3,147,945
MANUAL SIX-WAY SEAT ADJUSTER
Filed March 28, 1962    3 Sheets-Sheet 2
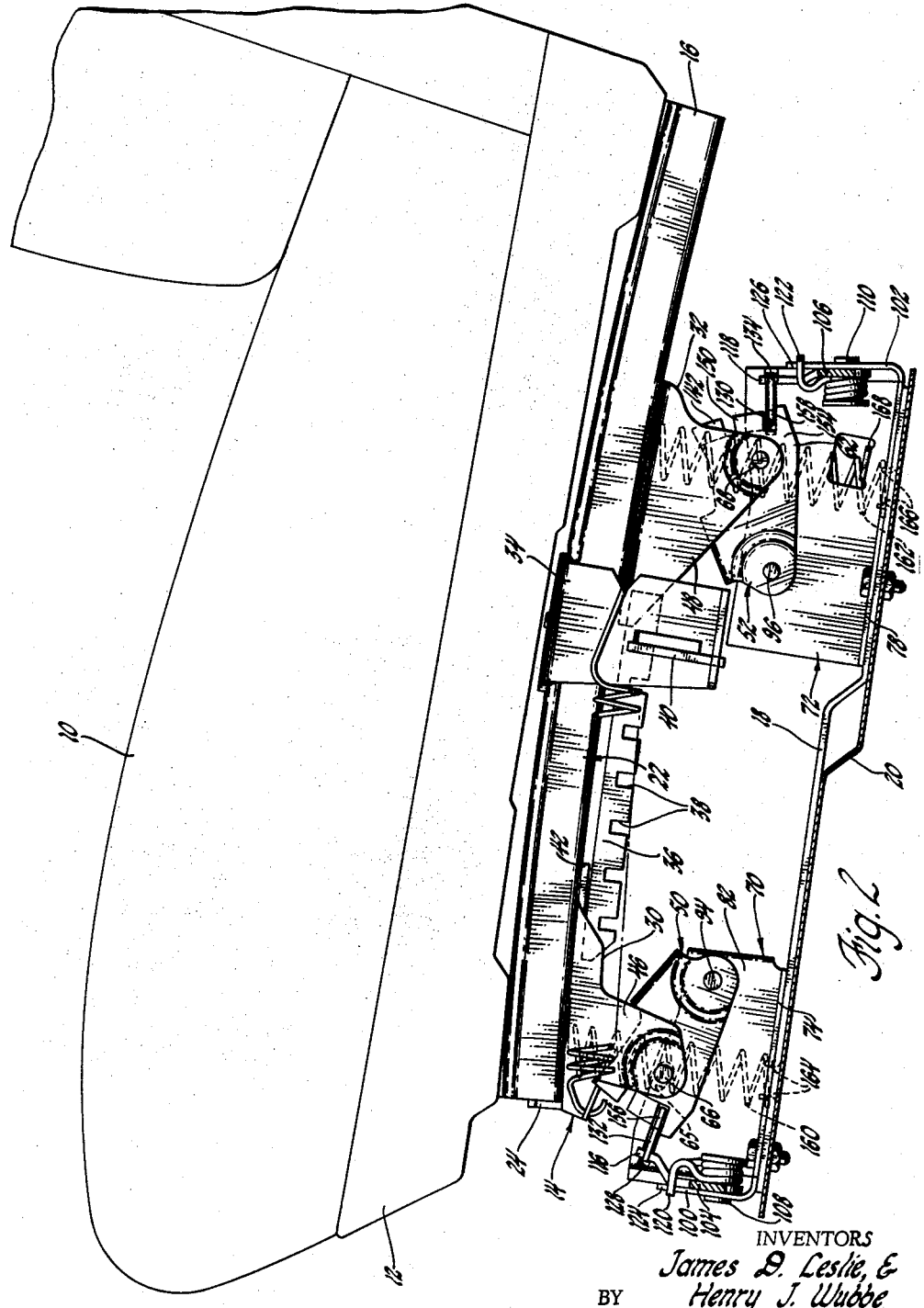
INVENTORS
James D. Leslie, &
BY    Henry J. Wubbe
J. L. Carpenter
ATTORNEY

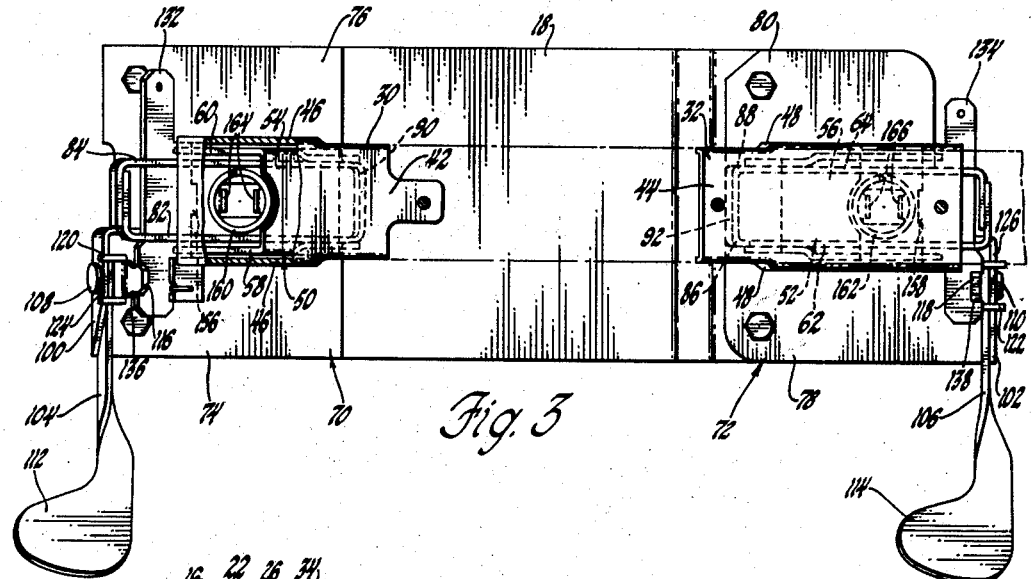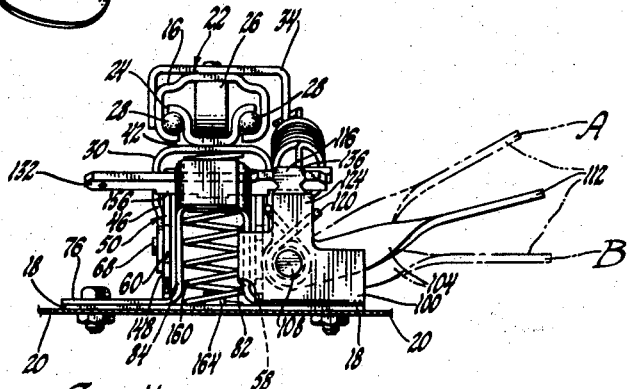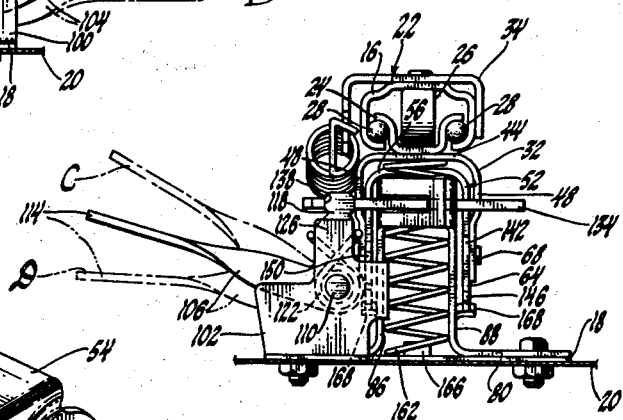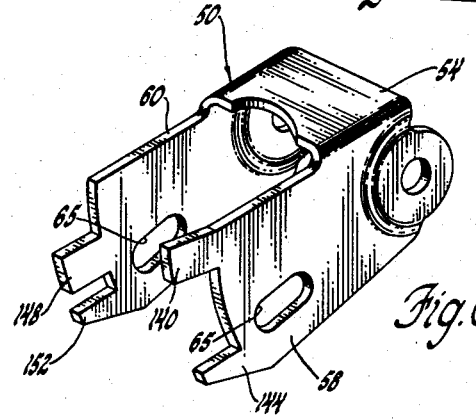

United States Patent Office
3,147,945
Patented Sept. 8, 1964

3,147,945
MANUAL SIX-WAY SEAT ADJUSTER
James D. Leslie, Birmingham, and Henry J. Wubbe, Royal Oak, Mich., assignors to General Motors Corporation, Detroit, Mich., a corporation of Delaware
Filed Mar. 28, 1962, Ser. No. 183,310
3 Claims. (Cl. 248—394)

This invention relates to vehicle seat adjusters and more particularly to a unit of the type which provides for manual, vertical and horizontal adjustment. The trend in vehicle seat adjusters is to provide a power actuated seat adjuster to move the seat to its various tilting, vertical and horizontal positions. Such seat adjusters are expensive and often require excess space beneath the seat for the installation of the power equipment.

An object of the present invention is to provide an improved, compact, manual six-way seat adjuster. Another object of this invention is to provide an improved manually operated six-way seat adjuster which allows easy fore and aft movement and positive indexing for vertical adjustment of the front or rear of the seat.

These and other objects, advantages and features of the invention will become more fully apparent as reference is had to the accompanying specification and drawings wherein:

FIGURE 1 is a side elevational view of the outboard side of the unique seat adjuster in the down position having a seat supported thereon.

FIGURE 2 shows a side elevational view of this seat adjuster and seat in the fully up position.

FIGURE 3 is a plan view partly in section of the vehicle seat adjuster taken generally in the direction of the arrows along the line 3—3 in FIGURE 1.

FIGURE 4 is a view taken substantially along line 4—4 of FIGURE 1 with parts in section and broken away. A front vertical operating lever is shown in a neutral position with phantom lines illustrating the two operating positions.

FIGURE 5 is a view taken generally in the direction of the arrows 5—5 of FIGURE 1 with parts in section and broken away showing the rear vertical adjusting mechanism. The rear vertical operating lever is shown in a neutral position with phantom lines illustrating the two operating positions of the lever.

FIGURE 6 is a perspective view of the front lift index.

It is to be understood that seat adjusters of this type are used in pairs and for ease of explanation only a left hand adjuster will be described.

Referring now to the drawings, and particularly FIGURES 1 and 2, there is shown a vehicle seat 10 mounted on a frame 12, supported by the unique seat adjuster unit indicated generally by numeral 14. The seat adjuster 14 has an upper support member 16 secured by rivets or other suitable means to the seat frame 12 and a lower support member 18 which is supported on the floor 20 of the vehicle. The lower support member 18 is secured to the vehicle floor by bolts or other suitable means.

The seat adjuster unit 14 consists of 3 mechanisms. A first mechanism regulates the fore and aft movement, the second mechanism regulates front up and down movement and a third mechanism regulates the rear up and down movement of the seat adjuster.

The first mechanism for fore and aft movement is essentially a conventional, horizontal seat adjuster mechanism indicated generally by the numeral 22. The horizontal seat adjuster mechanism 22 consists of an upper C-shaped track which also serves as the upper support member 16 and a lower generally U shaped track 24. The tracks 16, 24 are held in spaced relationship to each other by roller bearings 26 and ball bearing 28 which reduce the friction between the tracks during their movement relative to each other. The upper track or support member 16, as previously stated, is secured to the seat frame 12. The lower track 24 is secured to two U-shaped support channels, 30 at the front and 32 at the rear, which are parts of the second and third mechanisms for up and down adjustment. Movement of the upper track 16 relative to the lower track 24 provides horizontal adjustment of the seat in the fore and aft direction.

A conventional latching means is utilized to secure the upper track from movement relative to the lower track in the horizontal adjusting mechanism. An L-shaped support bracket 34 is secured to the upper track by rivets or other suitable means. Secured to the lower track 24 is another L shaped bracket 36 with keeper notches 38 formed along its lower edge. A lock bar 40 is pivotally mounted on support bracket 34 and spring biased to cooperate with the keeper notches 38 of bracket 36 to secure the horizontal adjusting mechanism from movement.

For horizontal adjustment, the lock bar 40 is pivoted from engagement with the keeper notch 38 freeing the tracks to move relative to each other to the desired position. The lock bar 40 is released and by cooperating with the appropriate keeper notch 38 secures the horizontal adjusting mechanism.

General features of the seat adjuster so far described comprise no part of the present invention and the assembly will be recognized by those skilled in the arts as of a type now commonly employed.

The linkages of the second and third mechanism for up and down movement at the front and rear of the seat adjuster are similar but reversed. For ease of understanding, parts for the second and third mechanisms will be described together. The linkages for these mechanisms can be seen in FIGURES 2, 3, 4 and 5.

The track support channels 30, 32 have web sections 42, 44 with depending legs 46, 48. The front and rear lift indexes 50, 52 are similar but not identical. A perspective of the front lift index can be seen in FIGURE 6. The lift indexes 50, 52 have web sections 54, 56 with depending arms 58, 60 and 62, 64, respectively. The arms 58, 60 of the front lift index 50 are slidably and pivotally connected by slots 65 to the depending legs 46 of the front track support channel 30 by rivets 66. The arms 62, 64 of the rear lift index 52 are pivotally connected to the depending legs 48 of the rear track support channel 32 by rivets 68.

The front and rear lower support brackets 70, 72 are formed with outwardly extending flange portions 74, 76 and 78, 80, respectively, which are secured to the lower support member 18 by welding or other suitable means. The inner edges of the flange portions 74, 76 and 78, 80 terminate in upwardly extending parallel side walls 82, 84 and 86, 88, respectively, which are connected by a central web section 90, 92 to form upwardly extending U shaped envelopes which have a width substantially less than the space between the depending arms 58, 60 and 62, 64 of the lift indexes 50, 52. The depending arms 58, 60 and 62, 64 of the lift indexes 50, 52 are pivotally connected to the wall sections 82, 84 and 86, 88 of the lower support brackets 70, 72 by rivets 94 and 96, respectively.

The front edge of flange 70 and the rear edge of flange 78 terminate in upwardly extending support arms 100, 102 which act as support brackets for the control levers 104, 106. The control levers 104, 106 are pivotally connected to the support arms 100, 102 by rivets 108, 110, respectively. The control levers 104, 106 are L shaped, one end being formed into handle portions 112, 114 and the other ends act as operating fingers 116, 118. Neutralizing torsion springs 120, 122 are mounted coaxially with rivets 108, 110 to return the control levers 104, 106 to a neutral position. The support arms 100, 102 have fingers 124, 126 extending above the rivets 108, 110 to which the springs 120, 122 are anchored at their neutral positions.

The support brackets 70, 72 have parallel slots 128, 130 in which are slidably mounted, lock bars 132, 134. The lock bars 132, 134 are formed with notches 136, 138 to receive the operating fingers 116, 118 of control levers 104, 106.

When the control levers 104, 106 are in the raised positions A, C as indicated by phantom lines in FIGURES 4 and 5, the lock bars 132, 134 are shifted inboard and when in positions B, D the lock bars 132, 134 are shifted outboard.

Referring now to FIGURES 1, 2 and 6, the arms 58, 60 and 62, 64 of the lift indexes 50, 52 are formed with sets of staggered fingers. The arms 58, 64 have upper fingers 140, 142 and lower fingers 144, 146, respectively. The arms 60, 62 have middle fingers 148, 150 and lower fingers 152, 154, respectively.

As can be seen in FIGURE 3, the lock bars 132, 134 have shoulder portions 156, 158 which cooperate with the fingers of the lift indexes 50, 52 to secure the seat in its various positions of vertical adjustment and serve as stops for indexing adjustments.

To assist upper movement of the seat adjuster, compression type assist springs 160, 162 are mounted around locator tabs 164, 166 of the lower support member 18 and nests against the web sections 42, 44 of the upper support channels 30, 32.

The compression springs 160, 162 are biased to move the upper support channels 30, 32 away from the lower support member 18.

This seat adjuster is arranged so that either the front or the rear of the seat may be adjusted independently in a vertical direction. The operation of the front and rear vertical adjusting mechanisms is identical. The front lift index 50 is provided with slots 65 which allow the seat adjuster to shift slightly fore and aft during vertical adjustment to prevent binding when the front lift index 50 and the rear lift index 52 approach their opposite extreme positions. Due to the difference in floor heights between the base of the front vertical adjusting mechanism and the base of the rear vertical adjusting mechanism, the rear lift index 52 is provided with support tabs 168 which stop and support the rear lift index 52 so that at its lowest position it is level with the front lift index 50 when it is bottomed on the lower support member 18, at its fully down position.

Since the operation of the front and rear vertical mechanisms is identical, the operation of the front vertical adjuster will be described.

As seen in FIGURE 1, when the seat adjuster is in its fully down position, shoulder 156 of lock bar 132 is positioned above the finger 140 and the bottom of fingers 152, 144 are resting on the lower support member 18, thus securing the front lift index 50. To move the front of the seat to the intermediate position, the handle 112 of the front control lever is lifted to position "A," as shown by the phantom lines of FIGURE 4. As the handle 112 is lifted to position "A," the control lever 104 pivots about rivet 108 causing the finger 116 to coact with the notch 136 of the lock bar 132 moving the lock bar inboard. When the lock bar 132 has been moved inboard, the shoulder 156 is clear of the finger 140 and the front vertical mechanism is then free to move upwardly. The shifting of the weight of the operator to the rear of the seat in a rocking chair motion, combined with the upward thrust of the compressed spring 160 will pivot the front lift index 52 clockwise about the rivets 94 raising the front of the seat. The shoulder 156, having been moved inboard to clear finger 140, will permit the front lift index 50 to travel upwardly until the top of finger 148 meets the shoulder 156. At this point, the front intermediate position is reached and the handle 112 is then released. When the handle is released, the torsion spring 120 rotates the control lever 104 downwardly to its neutral position causing finger 116 to cooperate with notch 136 and move the lock bar 132 outboard, thus placing the shoulder 156 above finger 148 and below finger 140 securing the lift index 50 in its intermediate position. To raise the front of the seat to its fully up position from the intermediate position, the handle 112 is depressed to position "B," as shown by phantom lines in FIGURE 4. This movement of the control lever 104 causes the finger 124, coacting with the notch 136, to slide the lock bar 132 outboard, moving the shoulder 156 clear of finger 148, thus freeing the front lift index 50 to rotate upwardly about rivets 94 until the shoulder 156 contacts the top of finger 144 preventing further upward travel. The handle 112 is then released and the neutralizing torsion spring 120 rotates the control lever 104 upwardly to its neutral position which moves the shoulder 156 inboard between fingers 148 and 152 and above finger 144, locking the front lift index 50 in its fully raised position as seen in FIGURE 2.

To lower the front of the seat, the procedure is reversed. It will be noted that one distinguishing feature of this seat adjuster is the positive stops at each position of vertical adjustment.

While but one embodiment of the invention has been shown and described, it will be evident that numerous changes and modifications may be made therein. It is, therefore, to be understood that it is not intended to limit the invention to the embodiments shown but only by the scope of the claims which follow.

We claim:

1. In combination with a vehicle seat, an adjuster unit for adjusting said vehicle seat relative to a vehicle floor, an adjusting mechanism for vertically adjusting one edge of said seat to a multiplicity of positions, said mechanism including a first support means secured to said vehicle floor, a second support means secured to said seat, a lift index having a web section and two parallel depending arms, said lift index pivotally interconnecting said first support means and said second support means for limited vertical movement therebetween, said arms having variably spaced fingers along parallel adjacent edges of said arms, one finger on each arm being in the same plane as a finger on the other arm for limiting movement of said lift index, all other fingers on each arm being staggered such that no finger on one arm is in the same plane as a finger on the other arm, a lock bar slidably supported on one of said support means for sliding movement into and from engagement with said fingers, said lock bar engaging said fingers when in a locked position for securing said index from movement, control means for moving said lock bar in opposite directions from said locked position, said lock bar moving from engagement with the fingers of one arm when moved in one direction from said locked position and moving from engagement with the fingers of the other arm when moved in the opposite direction from said locked position, said fingers being spaced on said arms for permitting vertical movement of said second support means between only two adjacent vertical positions for adjustment for a first movement of said lock bar from said locked position such that said lock bar must be returned to said locked position from the first position of movement away from said locked position and then moved in a second direction opposite from said first direction of movement of said lock bar to permit vertical movement of said second support means in the same direction after each step of vertical adjustment.

2. In combination with a vehicle seat, a seat adjuster unit for adjusting said vehicle seat relative to a vehicle floor, an adjusting mechanism for vertically adjusting one edge of said seat to a multiplicity of positions, said mechanism including a first support means secured from movement to said vehicle floor, a second support means secured to said seat, a lift index having a web section and two depending parallel arms, said lift index pivotally interconnecting said first support means and said second support means for limited vehicle movement therebetween, said arms having spaced fingers along parallel adjacent edges of said arms, one finger on each arm being in the same plane as a finger on the other arm for limiting movement of said lift index, all other fingers on each arm being staggered such that no finger on one arm is in the same plane as a finger on the other arm, a lock bar slidably supported on one of said support means for sliding movement into and from engagement with said fingers, said lock bar contacting said fingers when in a locked position for securing said index from movement, a control handle movably secured to said support means supporting said lock bar, biasing means biasing said handle to a neutral position, said lock bar being operably connected to said handle for slidably moving from said locked position when said handle is moved from said neutral position, said handle being movable in opposite directions from said neutral position, said lock bar being moved from contact with the fingers of one of said arms when moved from said locked position by movement of said handle in one direction from said neutral position and from contact with the fingers of the other of said arms when moved from said locked position by movement of said handle in the opposite direction from said neutral position, said fingers being spaced on said arms such that movement of said handle in either direction from said neutral position only permits vertical movement of said second support means between two adjacent vertical positions of adjustment.

3. In combination, in a seat adjuster unit having an elongated upper support member adapted to support a vehicle seat, an elongated lower support member adapted to be supported on a vehicle floor, a vertical adjusting mechanism for adjusting one end of said upper support means generally vertical relative to the adjacent end of said lower support member, a lock bar movably supported on one of said support members for movement from a locked position to a plurality of unlocked positions, a lift indexing means pivotally interconnecting said support members for adjusting said vertical mechanism; said indexing means having parallel arms, a multiplicity of fingers on adjacent parallel edges of said arms for cooperating with said lock bar for securing said indexing means from movement when said lock bar is in said locked position, one finger on each arm being in the same plane as a finger on the other arm for limiting movement of said indexing means, all other fingers on each arm being staggered such that no finger on one arm is in the same plane as a finger on the other arm.

References Cited in the file of this patent

UNITED STATES PATENTS

| | | |
|---|---|---|
| 2,609,029 | Haberstump | Sept. 2, 1952 |
| 2,795,267 | Williams | June 11, 1957 |
| 2,983,307 | Meyer | May 9, 1961 |